United States Patent
Miranda et al.

(10) Patent No.: US 6,540,460 B2
(45) Date of Patent: *Apr. 1, 2003

(54) TAMPER INDICATING TOOL ENGAGING HEAD

(75) Inventors: Peter T. Miranda, Rockford, IL (US); Andrew Moschea, Belvidere, IL (US)

(73) Assignee: Textron Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/045,226

(22) Filed: Nov. 9, 2001

(65) Prior Publication Data

US 2002/0071734 A1 Jun. 13, 2002

Related U.S. Application Data

(63) Continuation-in-part of application No. 09/643,048, filed on Aug. 21, 2000, now Pat. No. 6,328,512.
(60) Provisional application No. 60/159,484, filed on Oct. 14, 1999.

(51) Int. Cl.$^7$ .......................... F16B 33/04; F16B 37/14
(52) U.S. Cl. .................... 411/5; 411/372.5; 411/410; 411/910; 411/919
(58) Field of Search .................. 411/3–5, 372.5, 411/402, 410, 186–189, 910, 919

(56) References Cited

U.S. PATENT DOCUMENTS

| | | | |
|---|---|---|---|
| 1,316,084 A | 9/1919 | Dake | |
| 1,875,930 A | 9/1932 | Martin | |
| 3,763,725 A | 10/1973 | Reiland | |
| 3,812,757 A | 5/1974 | Reiland | |
| 4,350,465 A | 9/1982 | Lovisek | |

*Primary Examiner*—Neill Wilson
(74) *Attorney, Agent, or Firm*—Trexler, Busnell, Giangiorgi, Blackstone & Marr, Ltd.

(57) ABSTRACT

A fastener having a tamper-evident sleeve thereon. The fastener has a shank and a double-headed driving portion that is integrally formed with the shank. The double-headed portion includes an outer head for driving the fastener into a work piece or nut and an inner head for removing the fastener from an assembly. The sleeve is on the inner head and prevents a tool from being engaged with the sleeve for removal of the fastener without there resulting some indication that someone has removed or tried to remove the fastener.

16 Claims, 6 Drawing Sheets

TAMPER INDICATING TOOL ENGAGING HEAD

CROSS REFERENCE

This patent application is a continuation-in-part of U.S. patent application Ser. No. 09/643,048, filed Aug. 21, 2000 now U.S. Pat. No. 6,328,512, which claims the benefit of U.S. Provisional Application Serial No. 60/159,484 filed Oct. 14, 1999.

BACKGROUND

An embodiment of the present invention relates to a tool engaging head on a fastener having a plurality of extending portions thereon, such as fins or "flashes", for indicating when someone has tampered with the fastener. Another embodiment of the present invention relates to a fastener that includes a tamper evident sleeve.

In many situations, fasteners must be applied to an assembly using a certain torque, thereby assuring that the fasteners are seated to the assembly under the proper tension. If this proper tension of the fasteners within the assembly is changed, the assembly may not be able to effectively perform its operation, thereby possibly causing the assembly to malfunction.

The primary way that the tension of an installed fastener would change within an assembly would be by unauthorized users loosening, tightening or removing the fastener with a tool that engages with a head of the fastener. Because any user can freely place a tool around the head of a fastener and loosen, tighten or remove and reinsert the fastener to the assembly, it cannot be guaranteed that the fastener has not been tampered with, thereby causing uncertainty as to whether the fastener will cause problems for the assembly, and essentially cause the assembly to malfunction.

OBJECTS AND SUMMARY

A general object of an embodiment of the invention is to provide a fastener having a tool engaging drive head having at least one extending portion thereon to prevent a tool from at least properly engaging with the tool engaging surfaces of the drive head of the fastener.

Another object of an embodiment of the invention is to provide a fastener having a tool engaging drive head having at least one extending portion thereon whereby if a standard drive tool is attempted to be engaged on the drive head above the extending portion, the tool will tend to cam out or rotate relative to the drive head since it cannot properly engage the tool engaging drive head.

Another object of an embodiment of the invention is to provide a fastener having a tool engaging drive head having at least one extending portion thereon whereby the extending portions can be removed so that a tool can engage with the tool engaging drive head in order to remove, loosen or tighten the fastener.

Yet another object of an embodiment of the invention is to give authorized personnel an indication when a fastener within an assembly has been tampered with, thereby allowing the authorized personnel to replace the tampered fastener with a new fastener.

Another object of an embodiment of the invention is to deter unauthorized users from tampering with the fastener since the tampering of the fastener will become known to authorized users.

A further object of an embodiment of the invention is to provide a fastener which will be able to be installed into an assembly without interfering with the tamper evident features of the fastener.

Briefly, and in accordance with at least one of the foregoing, an embodiment of the invention provides a fastener having a tamper indicating tool engaging drive head.

The fastener has a shank including a threaded shank portion. The fastener also has a double-headed driving portion that is integrally formed with the shank. The double-headed portion includes an outer head for driving the fastener into a work piece or nut and an inner head for removing the fastener from an assembly. The inner head is joined to the outer head such that the inner head is positioned between the outer head and the shank. Extending portions, such as fins or flashes, extend from tool engaging surfaces of the inner head. In use, the fastener is driven into an assembly via a proper tool that engages with the outer head. The outer head shears off the fastener when the desired torque is achieved, leaving only the shank within the assembly and the inner head exposed. Due to the extending portions on the tool engaging surfaces of the inner head, the fastener cannot be moved unless the extending portions are first broken off or otherwise removed from the inner head, thereby allowing a tool to properly engage with the tool engaging surfaces of the inner head. Because the extending portions must be removed for the tool to engage the fastener within the assembly, it will be evident when the fastener has been tampered with, thereby indicating to the proper personnel that the fastener should be replaced with a new fastener.

Another embodiment of the present invention provides a fastener having a sleeve thereon, such as on its inner head. The fastener includes a shank and a double-headed driving portion that is integrally formed with the shank. The double-headed portion includes an outer head for driving the fastener into a work piece or nut and an inner head for removing the fastener from a work piece or nut. The inner head is joined to the outer head such that the inner head is positioned between the outer head and the shank. At least one extending portion, such as a plurality of fins or flashes, extend from the inner head. The sleeve is disposed on the inner head, under the extending portions. The extending portions are configured to prevent the sleeve from being removed from the inner head, once the fastener has been installed, without there resulting some indication that someone has removed or at least tried to remove the sleeve from the fastener. The sleeve itself is configured to indicate when a tool has been engaged with the sleeve (i.e., engaged with the inner head) for purposes of removing the fastener. Preferably, the sleeve is made of tamper evident material, such as collapsible plastic that may be round in shape for difficult gripping. In use, the fastener is driven into an assembly via a proper tool that engages with the outer head. The outer head shears off the fastener when the desired torque is achieved, leaving only the shank within the assembly and the inner head exposed. Due to the extending portions on the inner head, the sleeve cannot be removed from the inner head without there resulting some indication of its removal. Due to the sleeve being disposed on the inner head, the fastener cannot be driven or rotated by engaging a tool with the sleeve without there resulting some indication that the fastener has been driven or rotated. Specifically, the sleeve is configured such that marring or gouges are formed on the sleeve as a result of engagement by a tool. To this end, the sleeve may be formed of plastic, fiber, rubber or some other suitable material.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
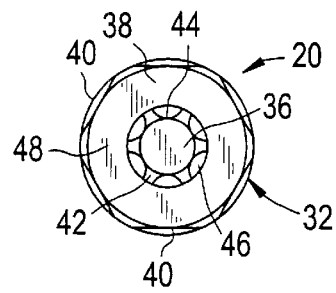
FIG. 1 is a top plan view of a hexagonal head end of a fastener in accordance with the invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 2:
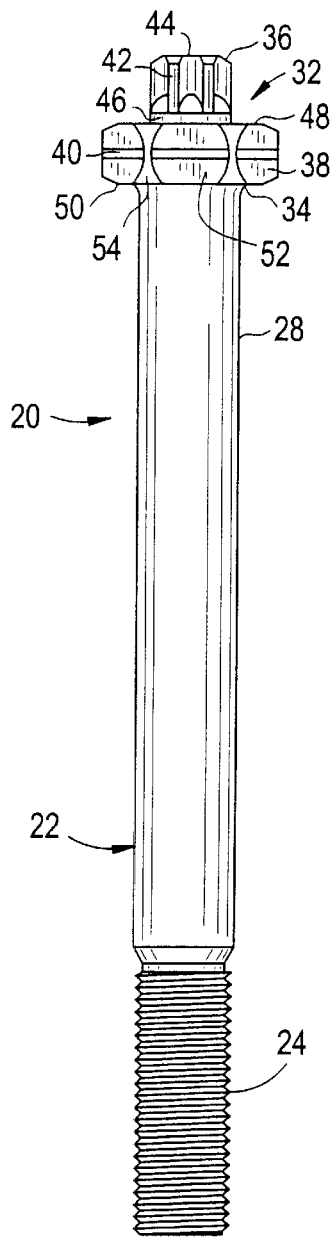
FIG. 2 is a side, elevational view of a fastener in accordance with the invention.

A fastener 20 is shown in FIGS. 1 and 2 of the drawings. The fastener 20 includes an elongated shank 22 including a screw-threaded shank portion 24 for threading into a parent body 26, such as a nut or a work piece, and an unthreaded shank portion 28 for insertion within an assembly 30 to be fastened together. The fastener 20 can be formed with or without the threaded portion 24. A double-headed driving portion 32 is preferably formed integral with an end 34 of the unthreaded shank portion 28. The double-headed portion 32 includes a small outer driving head 36 for driving the fastener 20 into the parent body 26. The double-headed portion 32 also includes a large inner removing head 38 for removing the fastener 20 from the assembly 30. The inner head 38 is adjoined to the outer head 36 such that the inner head 38 is preferably integrally formed between the outer head 36 and the unthreaded shank portion 28. A plurality of extending portions, such as fins or "flashes" 40, are also preferably integrally formed on the large inner removing head 38. As will be explained in more detail hereinbelow, the flashes 40 act as indicators on the fastener 20 to determine whether the fastener 20 has been tampered with. It should be noted that a single extending portion may be used and achieve the same function of the invention.

The small outer head 36 of the double-headed portion 32 of the fastener 20 is an "AUDITORX®" driving head having a series of convexly curved tool engaging surfaces forming six projections or lobes 42 separated by concave tool engaging surfaces or flutes 44 in a manner that permits a matching driving tool to supply a positive driving torque without slipping of the tool or rounding of the projections 42. An intermediate portion 46 is preferably provided inwardly of the tool engaging surfaces 44 of the outer head 36 and joins the outer head 36 to the inner head 38. The intermediate portion 46 is of a generally circular cross section, and the area defined by the diameter of the intermediate portion 46 is larger than the area defined by a bottom surface of the outer head 36. Although the AUDITORX® outer head configuration disclosed is preferred for the outer head 36, such outer head 36 may be provided with any other suitable driving means.

Figure 4:
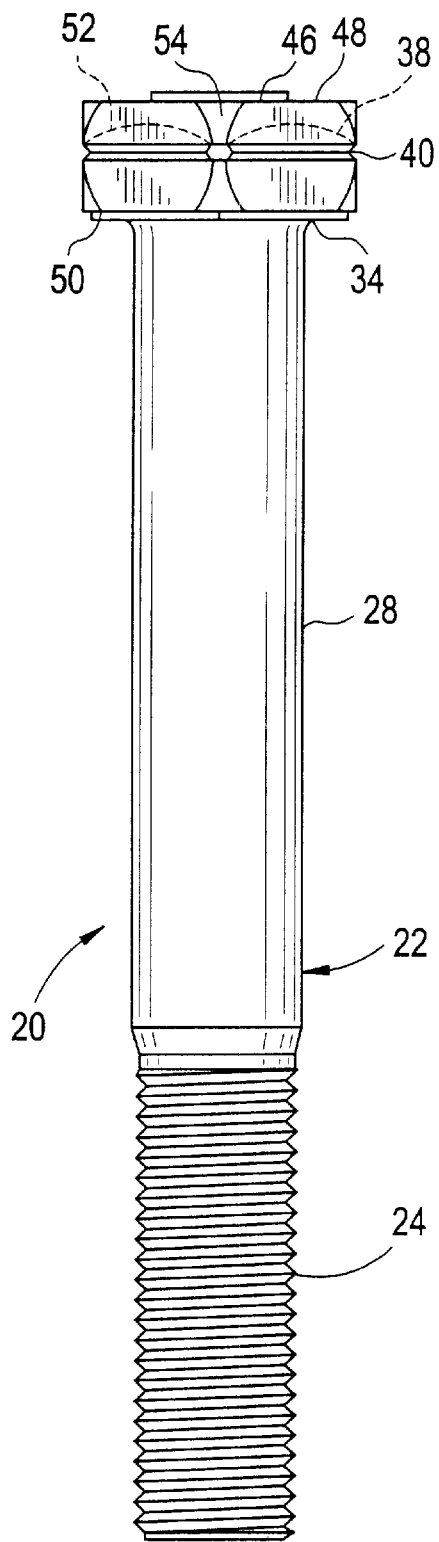
FIG. 4 is a side, elevational view of the fastener having a square head end and after the outer driving head has sheared off of the fastener.

The large inner head 38 of the double-headed portion 32 of the fastener 20 is preferably hexagonal in structure. The inner head 38 of the double-headed portion 32 of the fastener 20 has a top surface 48, a bottom surface 50, and six side tool engaging surfaces 52. The area defined by the top surface 48 is preferably larger than the area defined by the bottom surface of the outer head 36. At least one of the tool engaging surface 52 of the inner head 38 has a flash 40 extending therefrom. In a preferred embodiment, the flashes 40 extend radially outward along the entire length of the tool engaging surface 52 from a first end of the surface 52 to a second end of the surface 52. Preferably, the flashes 40 extend radially outward along the entire length of the tool engaging surface 52 at a position equidistant from the top surface 48 and the bottom surface 50. Also in a preferred embodiment, the flashes 40 are in the form of curved segments. The inner head 38 also has a plurality of relieved portions 54 which extend from the flashes 40 to either the top or bottom surfaces 48, 50. The relieved portions 54 are between each of the tool engaging surfaces 52 of the inner head 38, such that one tool engaging surface 52 does not come into contact with another tool engaging surface 52. The relieved portions 54 are Although the hexagonal inner head configuration disclosed is preferred for the inner head 38, such inner head 38 may be provided with any other suitable tool-engaging head, such as a square head as in FIG. 4.

The method of manufacturing the invention is through the use of dies and punches as disclosed in U.S. patent application Ser. No. 3,812,757, entitled "Threaded Fastener With Torque Control Head", which is commonly owned by the assignee of the present invention and the entire disclosure of which, both method and structure, is herein incorporated by reference. The forming of the inner head 38 to have the hexagonal configuration, as well as the forming of the flashes 40 on the tool engaging surfaces 52 of the inner head 38, can either be formed by a separate die and punching process or can be incorporated into the original die and punch process. It should be noted that the forming of the double-headed portion 32 of the fastener 20 can also be done in accordance with any other techniques known in the art.

Figure 3:
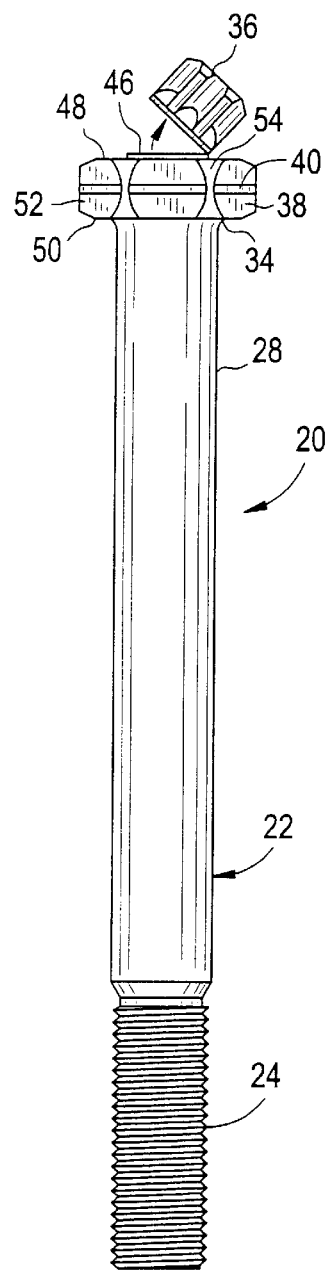
FIG. 3 is a side, elevational view of the fastener depicting an outer driving head after having been sheared off of the fastener in accordance with the invention.
Figure 5:
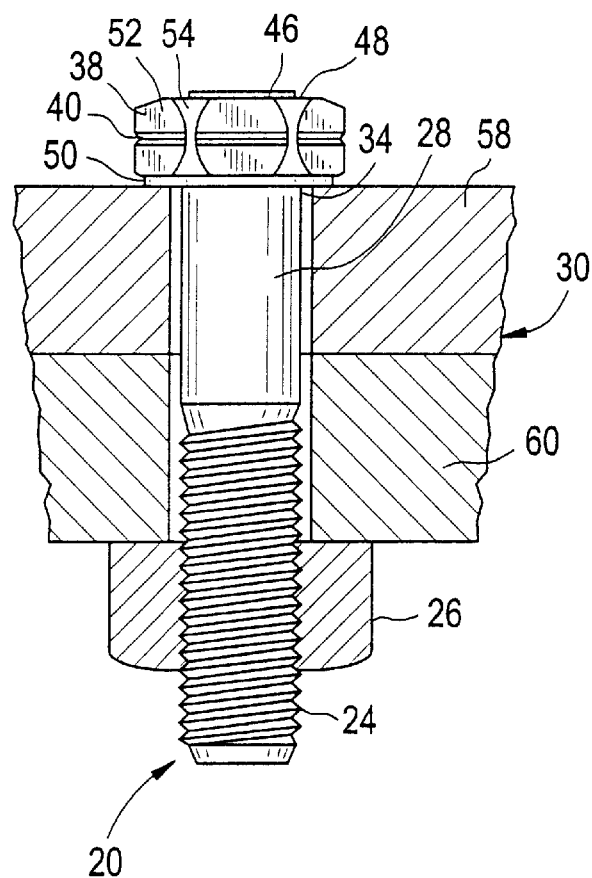
FIG. 5 is a side view of the fastener in FIG. 2 after its application to an assembly.

In use, the fastener 20 is inserted through a pilot hole of an assembly 30 to be fastened together as shown in FIG. 5, including plates 58, 60. The protruding threaded shank portion 24 is threaded into an internally threaded parent body 26, such as a nut, by applying a matching wrenching tool (not shown) to the outer head 36. Driving torque is applied to the outer head 36 until the outer head 36 is sheared from the fastener 20 as described in U.S. Pat. No. 3,812,757, entitled "Threaded Fastener With Torque Control Head" and previously incorporated by reference hereinabove. The driving of the fastener 20 by the outer head 36 allows the fastener 20 to be installed without interfering with the flashes 40 of the inner head 38. The outer head 36 shears off of the fastener 20, as illustrated in FIG. 3, when a predetermined torque is reached while driving the fastener 20 into the assembly 30. The torque that the outer head 36 shears off of the fastener 20 at also provides that the fastener 20 is seated within the assembly 30 at the desired tension.

Because it is very important in many assemblies that the tension of a fastener within the assembly remain at that desired tension, it is necessary to know if anyone or anything has in any way tampered with the fastener, thereby possibly changing the tension of the fastener within the assembly. The flashes 40 extending from the tool engaging surfaces 52 of the inner head 38 act as indicators, as well as preventors, of tampering with the fastener 20. Once the fastener 20 is seated at the desired tension within the assembly 30, the only way for the tension of the fastener 20 within the assembly 30 to change within the assembly 30, is to engage a proper tool with the tool engaging surfaces 52 of the inner head 38 and then, through the proper procedure associated with the tool, change the tension or remove the fastener 20 from the assembly 30. The flashes 40, however, deter any unauthorized persons from changing the tension or removing the fastener 20 from the assembly 30. The flashes 40 will also indicate to authorized persons whether any unauthorized persons have attempted to tamper with the fastener 20.

When the flashes 40 are situated on the tool engaging surfaces 52 of the inner head 38, the only way for the fastener 20 to be removed from the assembly 30 would be for a person to break off the flashes 40 from the fastener 20, possibly by grinding or chiseling, thereby allowing the person to engage a proper tool to the tool engaging surfaces 52 of the inner head 38 and, using the proper technique for that tool, remove the fastener 20 from the assembly 30. Because of this, an authorized person would know for sure as to whether the fastener 20 had been tampered with, i.e., was the tension of the fastener 20 changed within the assembly 30 or was the fastener 20 removed from the assembly 30 at some prior point in time. If the authorized person noticed that one or more of the flashes 40 was broken off of the fastener 20, the authorized person would know that the fastener 20 had been tampered with. The authorized person would then know to replace the fastener 20 that was tampered with, with a new fastener 20, which would be applied to the assembly 30 at the desired tension.

If the unauthorized user does not tamper with the fastener 20 by breaking off the flashes 40, the user may still try to engage a tool with the tool engaging surfaces 52 of the inner head 38. While the tool may engage the tool engaging surfaces 52 of the inner head 38 above the flashes 40, the tool will tend to cam out or rotate relative to the inner head 38 since, in actuality, it is not properly engaging the tool engaging surfaces 52 of the inner head 38. Further, the relieved portions 54 on the inner head 38 also help prevent the tool from properly engaging with the tool engaging surfaces 52 of the inner head 38.

Figure 6:
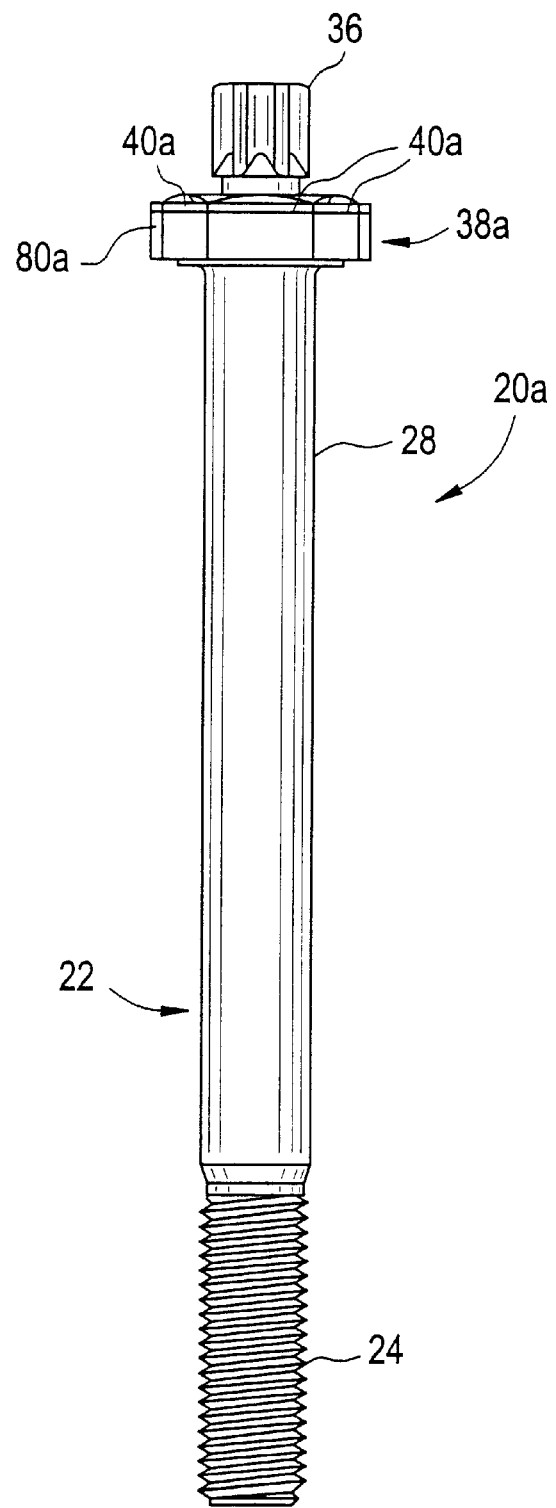
FIG. 6 is a side view of a fastener which is in accordance with another embodiment of the present invention.
Figure 7:
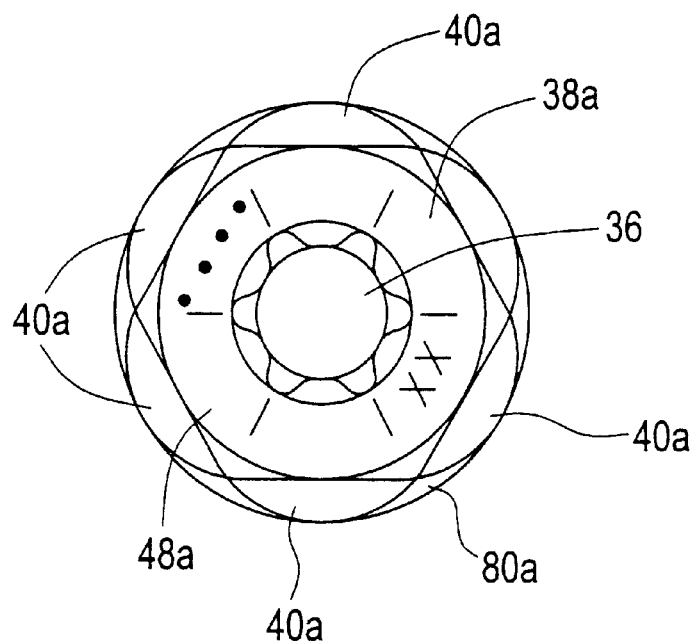
FIG. 7 is a top view of the fastener shown in FIG. 6.
Figure 11:
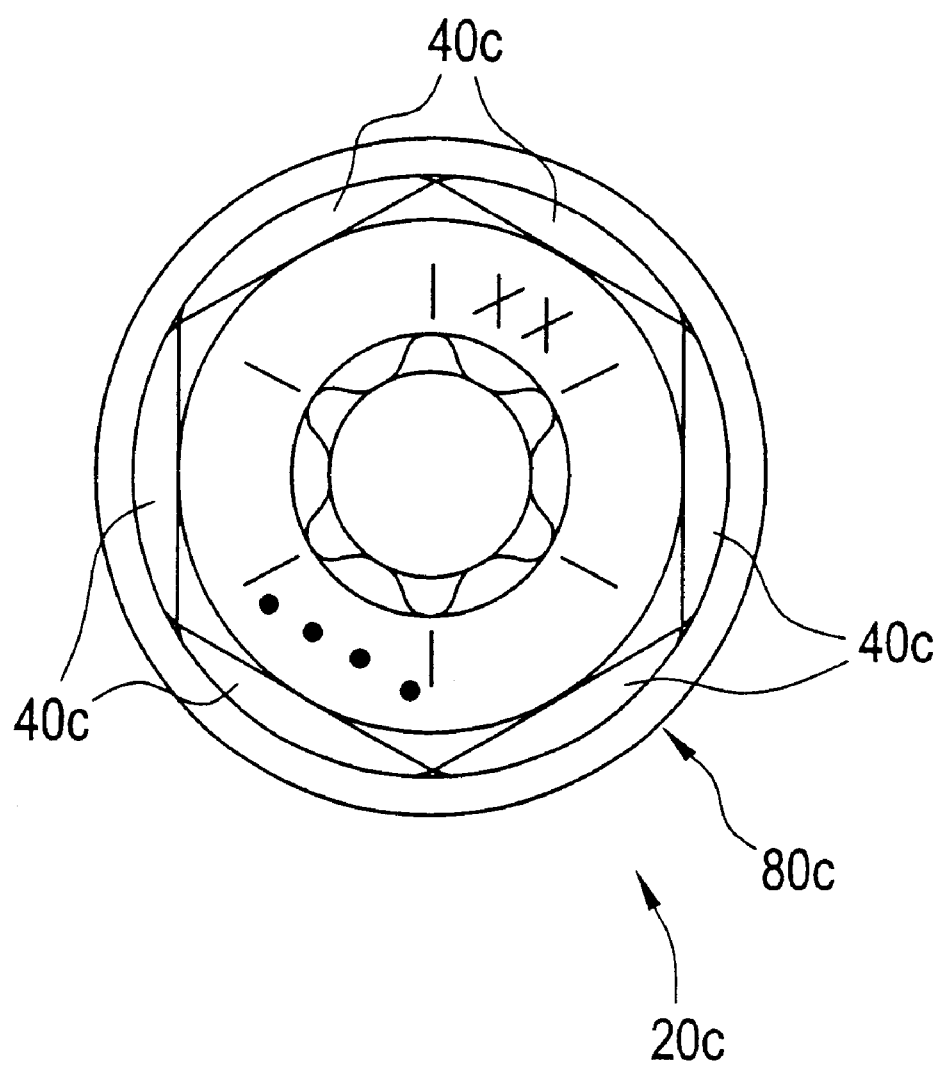
FIG. 11 is a top view of an alternative sleeve which can be used in association with the fastener shown in FIG. 6.

Another embodiment of the present invention is shown in FIGS. 6 and 7. Fastener 20a shown in FIGS. 6 and 7 is very similar to the fastener 20 shown in FIGS. 1–5 and described in detail hereinabove. For example, fastener 20a includes an elongated shank 22, a screw-threaded shank portion 24, an unthreaded shank portion 28, and an outer head 36 identical to fastener 20. However, fastener 20a differs from fastener 20 in that one or more extending portions, such as a single circumferential flange or, as shown in FIGS. 6 and 7, a plurality of fins or flashes 40a, are provided in a different location on the inner head 38a. Like the extending portions 40 of fastener 20, the extending portions 40a (i.e., fins or flashes) extend radially outward from the inner head 38a, but on fastener 20a, the extending portions 40a are located proximate the top surface 48a of the inner head 38a. While FIG. 7 shows a plurality of fins or flashes 40a, this structure may be provided as a single continuous flange around the periphery of the inner head 38a. Additionally, a sleeve 80a is provided on the inner head 38a. The sleeve 80a is disposed on the inner head 38a, generally under the extending portions 40a, i.e. generally between the extending portions 40a (or single extending portion) and the unthreaded shank portion 28. So as not to impede the seating of the fastener, preferably the height of the sleeve 80a is less than the height of the inner head 36a. The extending portions 40a are configured to prevent the sleeve 80a from being removed from the inner head 38a (i.e. by pulling the sleeve 80a over the extending portions 40a) without there resulting some indication that someone has removed the sleeve 80a from the fastener 20a. Specifically, the extending portions 40a and the sleeve 80a are configured such that is difficult to pull the sleeve 80a over the extending portions 40a, and even if the task is accomplished, some deformation results to the sleeve 80a such that if the sleeve 80a is replaced on the inner head 38a, it is evident that the sleeve 80a has been removed from the fastener 20a. To this end, as shown in FIG. 7, the sleeve may be thick enough such that the outside diameter of the sleeve 80a is about as large as the extent to which the one or more extending portions 40a extend radially outward. Alternatively, as shown in FIG. 11, a fastener 20c can be provided similar to fastener 20a, but where the outside diameter of the sleeve 80c is larger than the extent to which extending portions 40c extend.

The sleeve 80a itself is configured such that if a tool is engaged with the sleeve 80a and rotated to effect rotation and removal of the fastener 20a, marring or gouges become formed on the sleeve 80a, thereby indicating that someone has removed or tried to remove the fastener 20a by engaging a tool with the sleeve 80a. The sleeve 80a may be formed of plastic which provides the desired evidence of tampering, or may be formed of some other material, such as fiber or rubber. Preferably, the one or more extending portion 40a are configured such that they cannot be broken off using one's fingers. As such, in order to remove the fastener, one would have to break off the sleeve 80a. Once the sleeve 80a has been broken off, one could use an open-end wrench or pliers on the hex on the inner head 36a (i.e. under the one or more extending portions 40a) in order to remove the fastener.

In use, the fastener 20a is driven into an assembly via a proper tool that engages with the outer head 36. The outer head 36 shears off the fastener 20a when the desired torque is achieved, leaving only the shank 22 within the assembly and the inner head 38a exposed. Once the fastener 20a has been installed, the sleeve 80a cannot readily be removed from the fastener 20a without there resulting some evidence of its removal. Additionally, a tool cannot be engaged with the sleeve 80a and the fastener 20a removed without there resulting some evidence (on the sleeve 80a) of its removal or attempted removal.

Figure 8:
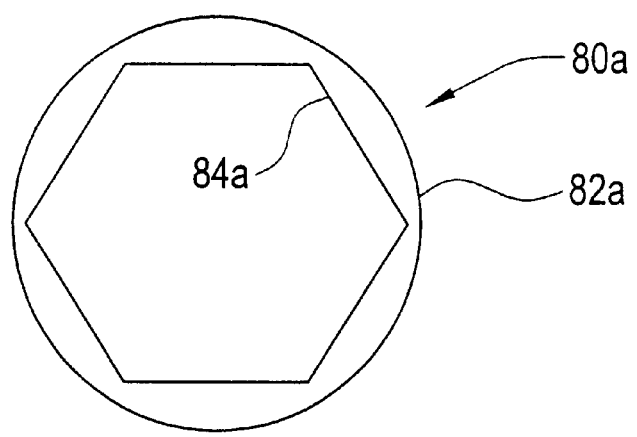
FIG. 8 is a top view of a sleeve component of the fastener shown in FIG. 6.
Figure 9:
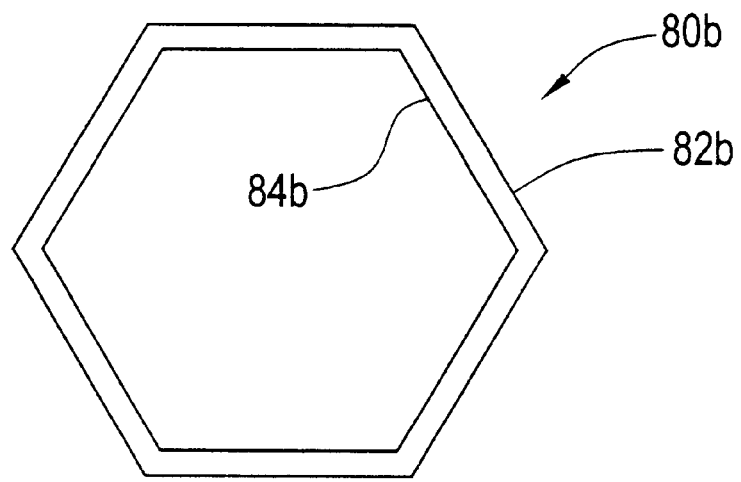
FIG. 9 is a top view of an alternative sleeve which can be used in association with the fastener shown in FIG. 6.
Figure 10:
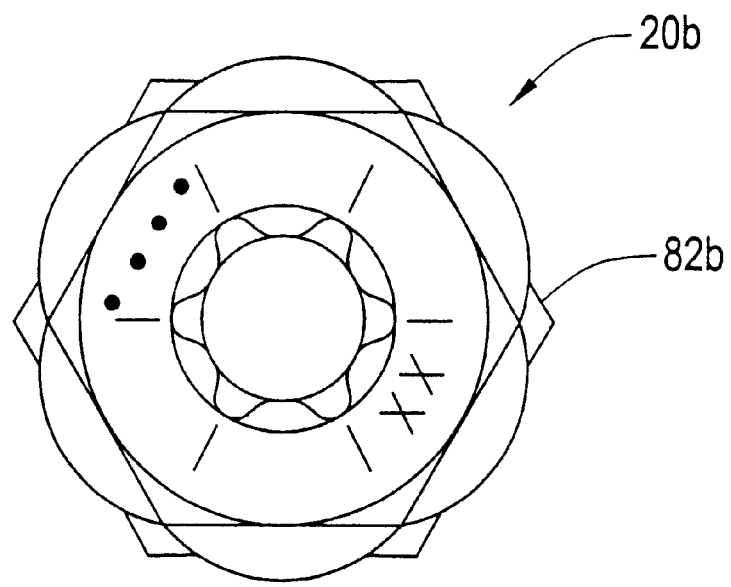
FIG. 10 is a top view of a fastener, much like that of FIG. 6, but where the sleeve shown in FIG. 9 is employed as opposed to the sleeve shown in FIG. 8.

The sleeve 80a of fastener 20a may be solid or may be gated plastic. The sleeve may be cored out to save material or meet processing requirements. The sleeve 80a may also take an unlimited number of shapes. In other words, effectively any shape can be employed for the sleeve 80a. However, as shown in FIG. 8, the sleeve 80a may have a circular outside diameter 82a and a hexagonal inside diameter 84a, in which case a top view of the fastener 20a would appear as shown in FIG. 7. Alternatively, a sleeve 80b, as shown in FIG. 9, having a hexagonal outside diameter 82b and a hexagonal inside diameter 84b can be employed, in which case a top view of the fastener (20b in FIG. 10) would appear as shown in FIG. 10.

While embodiments of the present invention are shown and described, it is envisioned that those skilled in the art may devise various modifications without departing from the spirit and scope of the foregoing description.

The invention is claimed as follows:

1. A fastener comprising:
   a shank having a first end and a second end;
   a double-headed portion on said first end of said shank, said double-headed portion including a driving head for driving said fastener and a removing head for removing said fastener;
   said removing head having a top surface and a bottom surface, said first end of said shank attached to said bottom surface of said removing head, said driving head attached to said top surface of said removing head, said removing head having at least one extending portion thereon.

2. A fastener as defined in claim 1, further comprising a tamper-evident sleeve disposed on the removing head.

3. A fastener as defined in claim 2, said at least one extending portion on said removing head being generally proximate said tamper-evident sleeve.

4. A fastener as defined in claim 2, wherein said shank is threaded proximate to said second end of said shank for threading said fastener into a parent body.

5. A fastener as defined in claim 2, wherein said driving head has a plurality of convexly curved tool engaging surfaces separated by a plurality of concave tool engaging surfaces, said convexly curved tool engaging surfaces and said concave tool engaging surfaces permit a driving tool to supply a positive driving torque.

6. A fastener as defined in claim 2, wherein said driving head is frangible.

7. A fastener as defined in claim 2, wherein said top surface of said removing head defines a larger area than an area defined by said bottom surface of said driving head.

8. A fastener as defined in claim 2, wherein said tamper-evident sleeve is formed of at least one of plastic, fiber and rubber.

9. A fastener as defined in claim 2, wherein said at least one extending portion on said removing head in configured to generally prevent removal of said tamper-evident sleeve from said removing head.

10. A fastener as defined in claim 2, wherein said removing head has a plurality of extending portions thereon configured to generally prevent removal of said tamper-evident sleeve from said removing head.

11. A fastener comprising:
    a shank having a first end and a second end;
    a double-headed portion on said first end of said shank, said double-headed portion including a driving head for driving said fastener and a removing head for removing said fastener;
    said removing head having a top surface and a bottom surface, said first end of said shank attached to said bottom surface of said removing head, said driving head attached to said top surface of said removing head; and a tamper-evident sleeve disposed on the removing head.

12. A fastener as defined in claim 11, wherein said shank is threaded proximate to said second end of said shank for threading said fastener into a parent body.

13. A fastener as defined in claim 11, wherein said driving head has a plurality of convexly curved tool engaging surfaces separated by a plurality of concave tool engaging surfaces, said convexly curved tool engaging surfaces and said concave tool engaging surfaces permit a driving tool to supply a positive driving torque.

14. A fastener as defined in claim 11, wherein said driving head is frangible.

15. A fastener as defined in claim 11, wherein said top surface of said removing head defines a larger area than an area defined by said bottom surface of said driving head.

16. A fastener as defined in claim 11, wherein said tamper-evident sleeve is formed of at least one of plastic, fiber and rubber.

* * * * *